United States Patent [19]

Markow et al.

[11] Patent Number: 5,682,290
[45] Date of Patent: Oct. 28, 1997

[54] PORTABLE COMPUTER HAVING LOUDSPEAKERS IN ENCLOSURES FORMED BY GASKETS LOCATED BETWEEN A KEYBOARD, A PRINTED CIRCUIT BOARD, AND A FRAME

[75] Inventors: Mitchell A. Markow, Houston; Michael S. Lempicki, Cypress; David E. Gough; Dennis D. Lamberth, both of Houston, all of Tex.

[73] Assignee: Compaq Computer Corporation, Houston, Tex.

[21] Appl. No.: 609,297

[22] Filed: Mar. 1, 1996

[51] Int. Cl.$^6$ .................. G06F 1/16; H05K 5/02
[52] U.S. Cl. ........................ 361/683; 361/680
[58] Field of Search .............. 312/7.1, 7.2, 8.16, 312/223.2; 181/141, 150, 199; 455/350; 381/90, 188, 205; 348/836; 361/680–683

[56] References Cited

U.S. PATENT DOCUMENTS 5,208,736  5/1993  Crooks et al. .................. 361/681

OTHER PUBLICATIONS

U.S. Serial No. 08/188,488 filed Jan. 28, 1994 for "Tiltable Docking Base with a Battery Charger".
Mcgraw–Hill Encyclopedia of Science & Technology 5th Edition Copyright 1982, 1977, 1971, 1966, 1960 Mcgraw–Hill, inc., pp. 813–818 for Loudspeaker.
Sharp PC–8700 Laptop—Has upwardly facing sound system in keyboard section of subnotebook portable computer. Actual device seen by Richard D. Fladung on Mar. 2, 1996 at an Office Depot off I–10 Highway in Houston, Texas but not opened.
"PORON® Cellular Urethanes—Physical Properties Data Sheet," ©1993 Rogers Corporation, Rogers Corporation Poron Materials Division, East Woodstock, Connecticut (3 pages).
"PORON® Cellular Urethanes—PORON© 4716–01; 4716–16; 4716–71 Flame Retardant Grades Typical Product Properties,"©1990 Rogers Corporation, Rogers Poron Materials Division, East Woodstock, Connecticut (1 page).
"PORON Cellular Urethanes—Poron Cellular Urethane Impact Absorption and Compression Force Deflection" ®1986, 1989, 1991 Rogers Corporation, High Performance Elastomers Division, Poron Materials Unit East Woodstock, Connecticut (2 pages).
December 9, 1992 Underwriters Laboratories, Inc. Flame Class (1 page).
September 11, 1991 Underwriters Laboratories, Inc. Component—Gasket Materials (1 page).
Satellite Pro 400 Series User's Guide, ©1995 by Toshiba Corporation, (2 pages).
FCC Grant Date of Jun. 16, 1995 corresponding to FCCID Number on back of actual Toshiba Satellite Pro 400 notebook computer shown in seven 8×10 color photos indicated immediately below.
Seven 8×10 color photos of actual Toshiba Satellite Pro 400 notebook computer. In particular:
Photo No. 1 shows the single speaker screen in the front of the keyboard section of the notebook computer.

(List continued on next page.)

*Primary Examiner*—Michael W. Phillips
*Attorney, Agent, or Firm*—Pravel, Hewitt, Kimball & Krieger

[57] ABSTRACT

A portable computer system having a loudspeaker enclosure defined by a printed circuit board, a keyboard section cover and a gasket. A second enclosure is defined by an existing frame, the keyboard section cover and a second gasket. Advantageously, a loudspeaker mounting system provides positive urging of the speaker with the keyboard section cover and all other openings, such as the grill attachment apertures and any other openings, are sealed to achieve the total enclosure concept for a speaker system for a portable computer.

20 Claims, 3 Drawing Sheets

OTHER PUBLICATIONS

Photo No. 2 is a plan view of the front of the keyboard section of the notebook computer with the speaker assembly removed.

Photo No. 3 is a perspective view of the inside of the single speaker screen shown in Photos 1 and 2 with the speaker assembly removed.

Photo No. 4 is a perspective view of the front of the speaker assembly shown assembled but removed from the notebook computer and showing the sealing material on the metal carriage about the speaker.

Photo No. 5 is a view of the back of the speaker assembly with the speaker and the rubber holder shown disassembled from the metal carriage.

Photo No. 6 is a perspective view of the back of the carriage showing the rubber holder positioned about the speaker and a cross arm positioned to secure the speaker and holder to the metal carriage upon screwing one end of the arm onto the carriage.

Photo No. 7 is a plan view similar to Photo No. 2 but with the speaker assembly positioned adjacent to the inside of the speaker screen with the sealing material between the carriage of the speaker assembly and the speaker screen.

TECRA™ 700 Series User's Guide ©1995 by Toshiba Corporation (2 pages).

FCC grant date of Oct. 25, 1995 corresponding to FCCID Number on back of actual Toshiba TECRA™ 700 Series notebook computer shown in four 8×10 color photos indicated immediately below.

Four 8×10 color photos of actual Toshiba TECRA™ 700 Series notebook computer. In particular :

Photo No. 1 is a top perspective view of the notebook computer with the name "TECRA™" in the front right corner.

Photo No. 2 is a top view of the keyboard section of the notebook computer showing the dual speaker screens in the "TOSHIBA" keyboard section.

Photo No. 3 is a top view of the keyboard section similar to Photo No. 9 but with the portion of the keyboard housing with the dual speaker screens removed to disclose two spaced apart speakers.

Photo No. 4 is top enlarged view of one of the speakers moved aside to show its mounting in the keyboard housing.

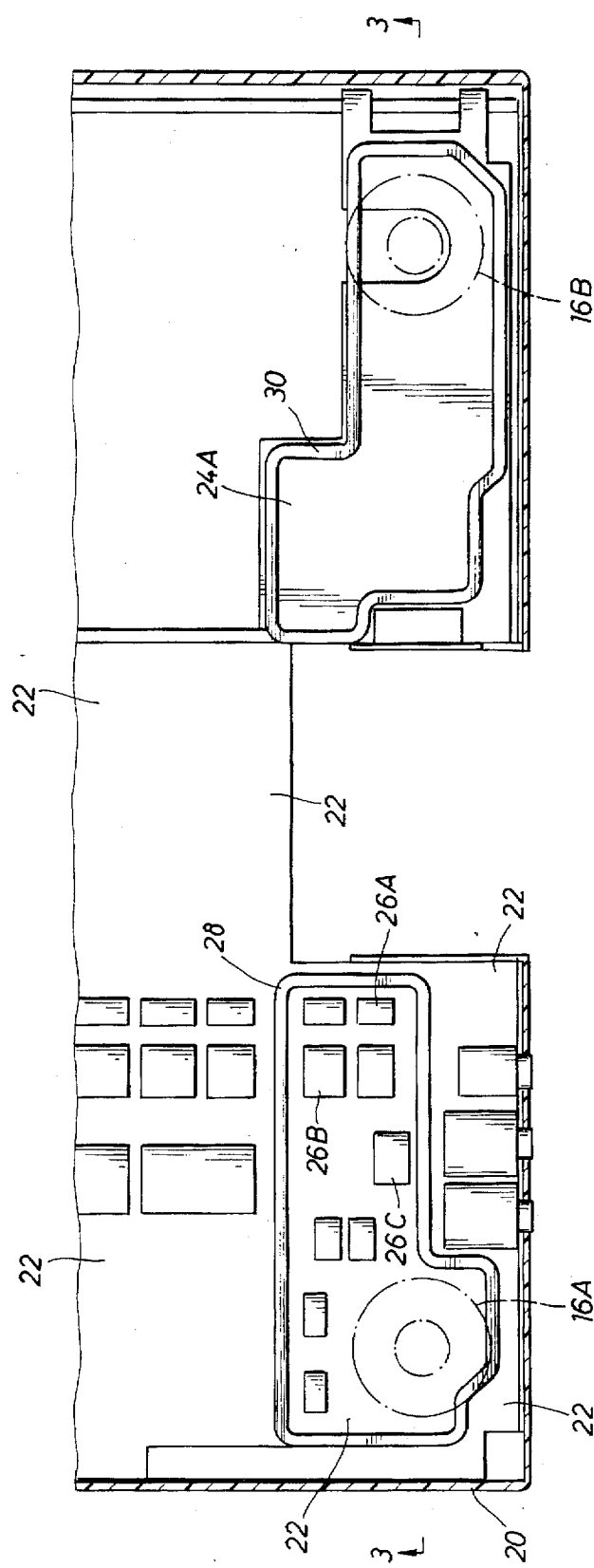
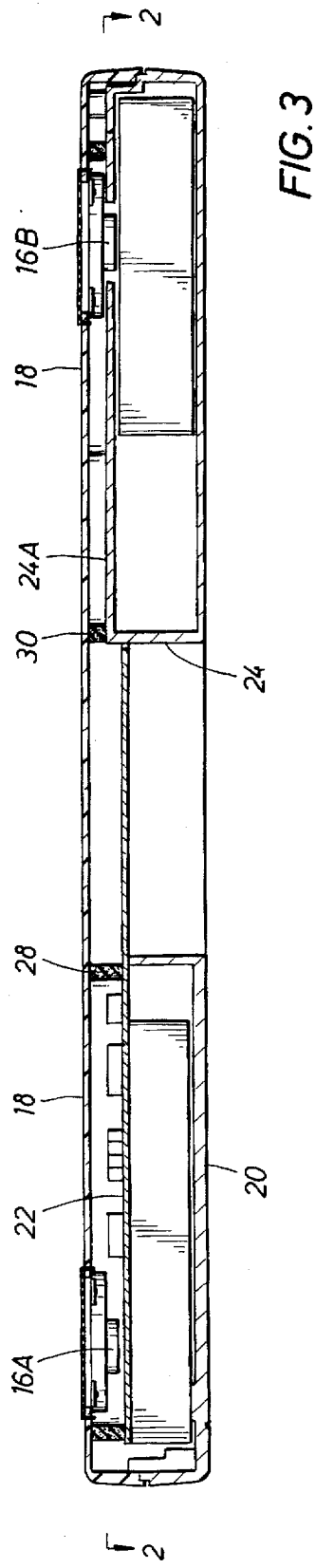

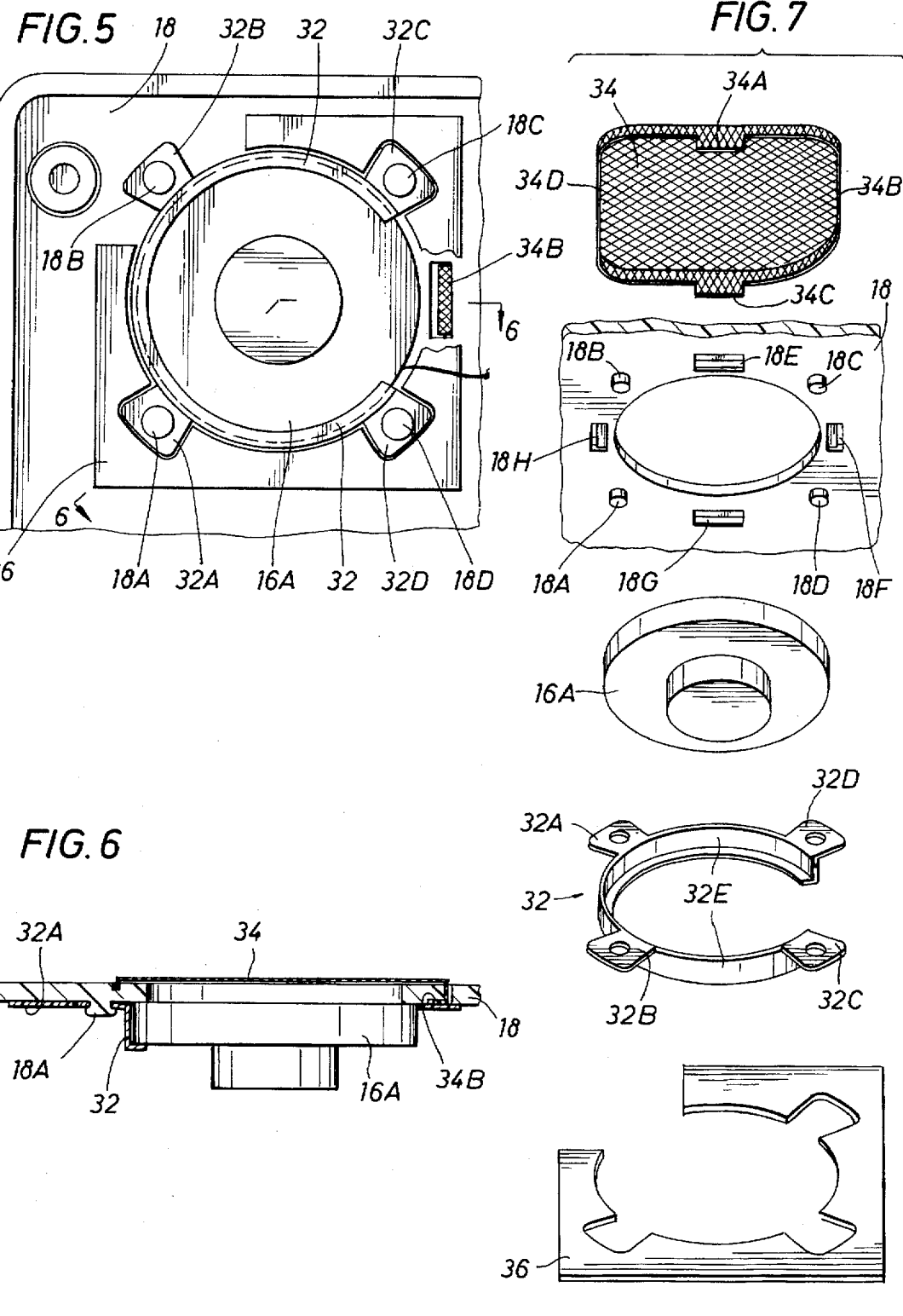

5,682,290

PORTABLE COMPUTER HAVING LOUDSPEAKERS IN ENCLOSURES FORMED BY GASKETS LOCATED BETWEEN A KEYBOARD, A PRINTED CIRCUIT BOARD, AND A FRAME

SPECIFICATION

1. Field of the Invention

This invention relates to portable computers, more particularly, to a loudspeaker enclosure for a portable computer.

2. Background of the Invention

Portable computers, such as the notebook computer shown in FIGS. 1 and 2 of U.S. Pat. No. 5,208,736, assigned to the assignee of the present invention, have been known in the past to include a housing having a screen section and a keyboard section. It has been found desirable to further decrease the size and weight of these portable computers, which have resulted in subnotebook computers, such as the Contura Aero subnotebook manufactured by the Compaq Computer Corporation. Such a subnotebook is shown in FIGS. 1, 2 and 4 of U.S. Ser. No. 08/188,488 filed Jan. 28, 1994, which is also assigned to the assignee of the present invention. Both U.S. Pat. No. 5,208,736 and U.S. Ser. No. 08/188,488 are incorporated herein for all purposes.

Even more recently, it has been found desirable to provide a speaker system in these notebook computers and subnotebook computers. These speaker systems comprise at least two loudspeakers. It has been identified that the sound quality coming from loudspeakers positioned in these portable computers could be improved by providing radiation-controlling structures or, more particularly, total enclosures for the loudspeakers of the speaker system. While two alternatives were considered, one using an independent total enclosure inside the computer housing for the loudspeakers or the other to use as many existing components of the portable computer to form a total enclosure in the computer housing. This total enclosure, in which the rear radiation is completely absorbed by the closed enclosure, is contrasted to a vented, or reflex, enclosure. Because of space limitations, particularly in the subnotebooks, and manufacturing concerns, a total enclosure using existing components was found more desirable.

Therefore, it would be desirable to have a portable computer, whether a notebook computer or subnotebook computer, using a gasket material with existing components to provide a radiation-controlling structure, or total enclosure, which could conserve space and reduce manufacturing and inventory cost. It would also be desirable to have a loudspeaker mounting system for the portable computer that seals the loudspeaker with the cover and that seals any openings used for attaching the speaker grill to the cover to achieve this total enclosure concept.

SUMMARY OF THE INVENTION

A portable computer having a speaker system including two loudspeakers is provided having a printed circuit board disposed in the keyboard section of the housing. The printed circuit board has a predetermined continuous track for receiving a presized and stiffened gasket to operatively provide a radiation-controlling structure, or total enclosure, for one of the loudspeakers defined by the printed circuit board, the cover of the keyboard section and the gasket. A total enclosure for the other loudspeaker is defined by an existing frame, the cover of the keyboard section and a second gasket. Advantageously, a loudspeaker mounting system provides positive urging of the speaker to seal with the cover of the keyboard section and all other openings, such as the grill attachment apertures and any other openings, are sealed to achieve the total enclosure concept for a speaker system for a portable computer.

BRIEF DESCRIPTION OF THE DRAWINGS

The objects, advantages and features of the invention will become more apparent by reference to the drawings which are appended hereto, wherein like numerals indicate like parts and wherein an illustrated embodiment of the invention is shown, of which:

FIG. 2 is a partial plan view taken along lines 2—2 of FIG. 3 of the printed circuit board and frame disposed inside the keyboard section upon removal of the cover of the keyboard section and the positioning of the first gasket on the printed circuit board and the second gasket on the frame;

FIG. 3 is a section taking along lines 3—3 of FIG. 2 further including the keyboard section cover having the first loudspeaker and second loudspeaker of the speaker system positioned over the printed circuit board and frame, respectively;

FIG. 5 shows an enlarged bottom view of the keyboard section cover of the present invention further illustrating the loudspeaker mounting system to achieve the total enclosure;

FIG. 6 is a section view taken along line 6—6 of FIG. 5; and

FIG. 7 is an exploded perspective view taken from the bottom of the cover of the keyboard section illustrating the speaker grill, the loudspeaker, loudspeaker bracket and sealing member for sealing the apertures positioned equidistant around the cover opening for receiving the speaker grill.

DETAILED DESCRIPTION OF PREFERRED EMBODIMENT

Figure 1:
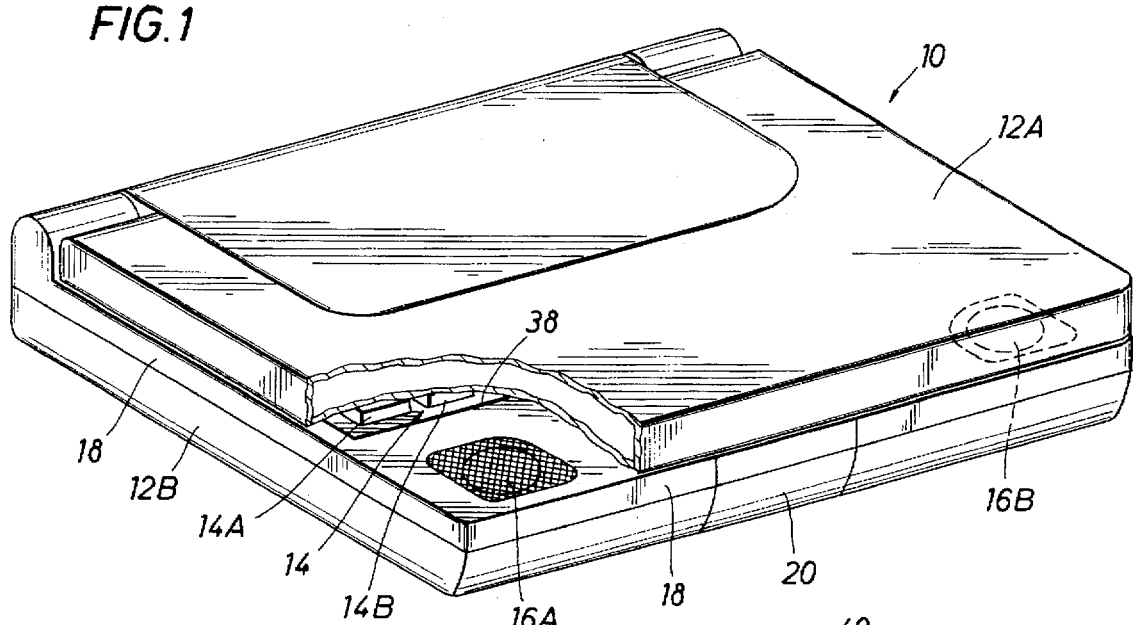
FIG. 1 is a perspective view of the portable computer of the present invention showing one of the loudspeakers of the speaker system in the computer keyboard section, as a result of the display section being partially cut away, and the other loudspeaker of the speaker system shown in phantom view.

FIGS. 1–7 disclose a portable computer, generally indicated at 10, of the present invention. While it is understood that a portable computer could include a notebook computer or a subnotebook computer, the present invention is particularly advantageous for use of a subnotebook computer because of the limitation of space and weight. The portable computer 10 includes a housing having a screen section 12A and a keyboard section 12B. The screen section having a screen, such as shown in the Figures of U.S. Pat. No. 5,208,736 which is incorporated herein for all purpose, can be rotated open for exposing the plurality of keys 14A, 14B of the keyboard, generally indicated at 14, in the keyboard section 12B of the computer 10. Advantageously, loudspeaker 16A and loudspeaker 16B provide a speaker system for the portable computer and are preferably positioned in the front top corners of the computer keyboard section 12B facing upwardly. This speaker system is exposed along with the keyboard 14 upon rotation of the screen section 12A of the portable computer 10 to the open position.

For purposes of disclosure, turning to FIG. 2, upon removal of the cover 18 of the keyboard section 12B from the body 20 of the keyboard section 12B, a printed circuit board 22 and a frame 24A is presented, such as shown in partial view of FIG. 2. More particularly, a printed circuit board 22, such as known by those skilled in the art for receiving integrated circuits and other electronic components and commonly used in computers, covers a majority of the facing area of the body 20 of the keyboard section 12B. FIG. 2 discloses these electronic components such as 26A, 26B and 26C, however, it is understood that in the present invention a "keep out" area or predetermined continuous track is provided on the printed circuit board 22 that is configured and sized for receiving the gasket 28. This track is preferably silk screened onto the printed circuit board for alignment of the gasket thereon and is not an indentation nor is this board modified structurally otherwise. In this predetermined continuous track area, upward projections were limited to being less than 0.04" in height from the board and, preferably, less than 0.03". The type of material used and the structural components of gasket 28 and gasket 30, received on structural member 24A of frame 24, provide unique qualities for achieving total enclosure of each loudspeaker 16A and 16B of the speaker system while also addressing concerns of manufacturing, as will be discussed below in detail.

As best shown in FIGS. 2, 3 and 5, the loudspeakers 16A and 16B are totally sealed in their respective radiation-controlling structure or total enclosure. More particularly, using an existing, except for the use of a continuous track, printed circuit board 22 as a rear enclosure solid wall and the existing keyboard section cover 18, preferably fabricated from plastic, as a front enclosure solid wall provide a total enclosure for the loudspeaker 16A, using only an additional gasket 28 while saving cost for components in a confined space. Likewise, by only the addition of the gasket 30, which is thinner than the gasket 28 because of the difference of height of the top surface of the structure 24A and the printed circuit board 22, used in combination with the existing keyboard section cover 18 and existing structural member 24A provides a total enclosure for loudspeaker 16B.

As best seen in FIG. 3, while each gasket 28 and 30 has its own continuous configuration, each has a generally rectangular cross section. Each gasket is fabricated from a high density microcellular open celled urethane that is die cut from sheets. Preferably, gaskets 28 and 30 are manufactured from a flame retardant grade urethane sold under the trademark "PORON" by Rogers Corporation, Poron Materials Division, of East Woodstock, Conn. In particular, gasket 28 has a Rogers Corporation product no. 4716-71-15250-1604 which is a black colored flame retardant grade cellular urethane provided in sheets of 0.25" thickness (plus or minus ten percent) having the desirable compression set and compression force/deflection properties to achieve the total enclosure. Gasket 30 is also fabricated from sheets of flame retardant grade cellular urethane having Rogers Corporation product no. 4716-16-20125-1633 with a thickness of 0.125" (plus or minus ten percent) also having the desirable properties to achieve the total enclosure.

Figure 4:
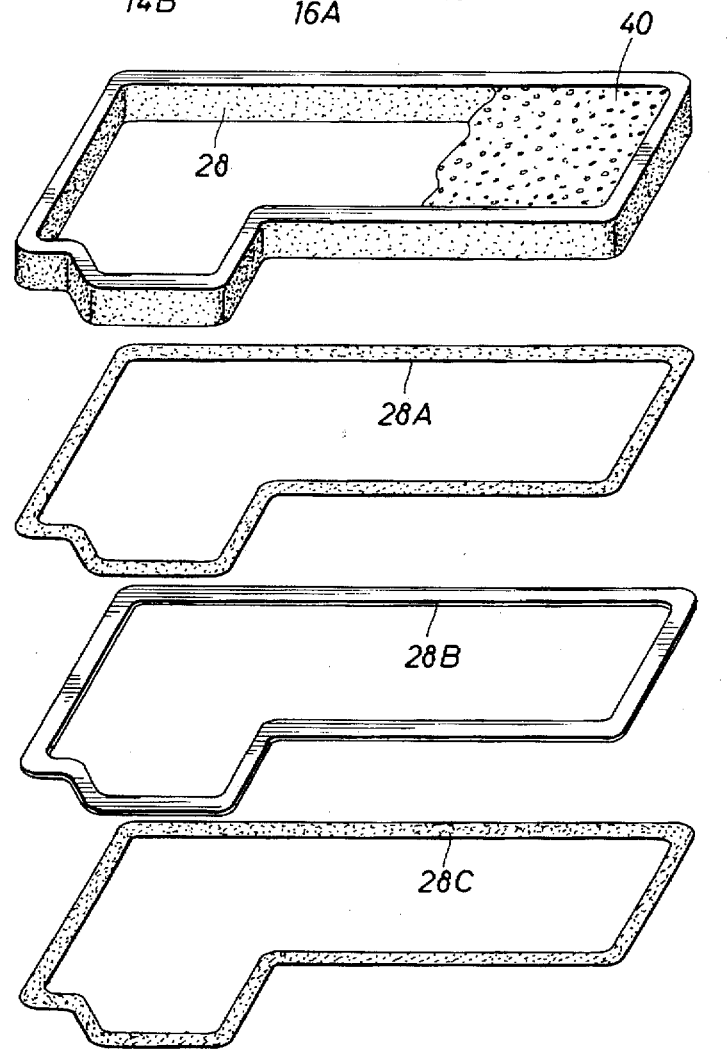
FIG. 4 is an enlarged perspective view of the gasket received on the printed circuit board with the plastic carrier between two adhesive layers as shown in exploded view.

Turning now to FIG. 4, the gasket 28 is shown in perspective from the top view along with the adhesive layer 28A, the MYLAR plastic carrier 28B and second adhesive layer 28C. Advantageously, to the manufacturing process, the carrier 28B provide structural support that maintains the configuration of the gasket to properly position the gasket to the track of the printed circuit board. This carrier maintains the configuration of the gasket while allowing the gasket to be fabricated from the open cell urethane to provide the desired compressibility and sealing by the gasket between the cover 18 and the printed circuit board 22. The compressibility of gasket 28 in combination with the adhesives and carriers, desirably provides an effective seal over any projections in the board track that could project up to 0.03" in height from the board. The gasket 28 preferably use an acrylic adhesive No. 9485PC provided by the 3M Company with a release liner.

The gasket 30, though thinner as discussed above, would use similar components and construction as gasket 28 but would preferably use an acrylic adhesive No. 9557MP provided by the 3M Company.

Turning now to FIGS. 5–7, the mounting system for the loudspeakers of the speaker system is disclosed. FIG. 5 discloses a bottom view of the keyboard section cover 18 upon which the mounting bracket 32 is attached. Though only the loudspeaker 16A is shown, a similar mounting system is provided for the loudspeaker 16B. The two concentric disks of loudspeaker 16A are received into the bracket 32 having equidistant spaced tabs 32A, 32B, 32C and 32D. Each of these tabs have a hole adapted to receive a corresponding post, preferably fabricated integrally with the bottom of the cover 18. In particular, tabs 32A, 32B, 32C and 32D are received about the posts 18A, 18B, 18C and 18D, respectively. It is important to note that the tabs are inclined upwardly, relative to the orientation seen in FIG. 7, from the generally circular portion 32E of bracket 32 to provide a "spring like" positive force or urging to the conventional diaphragm seal (not shown) of the loudspeaker 16A to seal the loudspeaker diaphragm with the bottom surface with the cover 18. Upon positioning of each of the tabs of the bracket 32 with their respective post, the plastic post are heated and deformed, such as shown for post 32A in FIG. 6, to retain the bracket 32 to the cover 18 while also urging the diaphragm of the loudspeaker 16A in sealing engagement with the cover 18.

The grill, generally indicated as 34, could be fabricated from a nonferrous material, such as like a 302 series aluminum to avoid concerns with magnetic flux. The grill has four legs 34A, 34B, 34C and 34D, to be received in cover apertures 18E, 18F, 18G and 18H, respectively. However, the grill 34 could be fabricated from stainless steel. These legs are then bent to secure the grill to the cover. Importantly, the cover is counterbored adjacent each aperture 18E, 18F, 18G and 18H so upon bending each of the legs of the grill 34, such as shown for leg 34B in FIG. 5, it would be flush with the bottom surface of the cover 18, as best shown in FIG. 6. After bending of each of the legs of the grill into its recessed or counterbored aperture a precut and sized sealing member 36, preferably a laminate tape, is applied to seal all the apertures 18E, 18F, 18G and 18H, to achieve the total enclosure of the speaker system.

Additionally, while not shown, if the keyboard 14 were attached to the bottom of the cover 18 and the space between the keyboard 14 and the bottom of the cover 18 provided a flow passage positioned on or within one of the enclosure defined by the gaskets 28 or 30, preferably that flow passage would be sealed using a double sided adhesive tape to achieve the total enclosure of the speaker system. For example, if the space, such as indicated by 38 in FIG. 1, were to pass within or on the gaskets 28 or 30 it would be sealed with the preferred tape.

Also, preferably an insert 40 could be used in each total enclosure for the speaker system to provide a desired sound quality. The insert could be fabricated from foam, and would preferably, though only shown in partial view in FIG. 4, be sized to completely fill each enclosure.

The foregoing disclosure and description of the invention are illustrative and explanatory thereof, and various changes in the size, shape and materials, as well as the details of the illustrated construction may be made without departing from the spirit of the invention.

We claim:

1. Portable computer system, comprising a housing having a screen section and a keyboard section; one of said housing sections having a body and a cover, said cover having an opening;

a loudspeaker positioned adjacent to said cover opening;

a board disposed in said housing body and having a predetermined continuous track; and a gasket received on said board track and sized to operably provide said loudspeaker in a radiation-controlling structure defined by said board, said cover and said gasket.

2. System of claim 1 wherein said housing body and cover is in said keyboard section.

3. System of claim 2 wherein said cover having a keyboard opening and further comprising a keyboard sized to be received in said cover keyboard opening.

4. System of claim 1 wherein said loudspeaker is sealed with said cover.

5. System of claim 4 further comprising said cover having a plurality of apertures around said cover opening and a speaker grill attached to said cover using said cover apertures, and a sealing member to seal said cover apertures after said grill is attached.

6. System of claim 4 further comprising a bracket having a plurality of elastic tabs; and a plurality of deformable posts integral with said cover and corresponding to said bracket tabs;

wherein said loudspeaker is received in said bracket and said posts secured said tabs to operably provide an urging of said loudspeaker to said cover.

7. System of claim 6 wherein said tabs are inclined relative to said bracket for urging said loudspeaker in sealing engagement.

8. System of claim 1 wherein said board is a printed circuit board.

9. System of claim 1 wherein said board predetermined continuous track having a projection of less than 0.04 inches in height from said board.

10. System of claim 1 wherein said gasket is continuous and has a rectangular cross-section.

11. System of claim 10 wherein said gasket is fabricated from a flame retardant open celled urethane.

12. System of claim 1 further comprising a presized insert positioned with said gasket between said cover and said board.

13. System of claim 1 further comprising said gasket having a top surface and a bottom surface; and an adhesive applied to said gasket bottom surface.

14. System of claim 13 further comprising said gasket having a carrier attached to said gasket bottom surface to maintain the configuration of said gasket while allowing the gasket to be fabricated to provide the desired compressibility of said gasket.

15. System of claim 14 wherein said carrier is fabricated from plastic.

16. System of claim 15 wherein said carrier having a top and a bottom; said carrier top secured to said gasket bottom and said carrier bottom secured to said board track.

17. Portable computer system, comprising a housing having a screen section and a keyboard section; one of said housing sections having a body and a cover, said cover having an opening;

a loudspeaker positioned adjacent to said cover opening;

a frame disposed in said housing body and having a structural member, said structural member having a predetermined continuous track; and a gasket received on said structural member track and sized to operably provide said loudspeaker in an enclosure defined by said structural member, said cover and said gasket.

18. System of claim 17 further comprising an insert positioned within said gasket between said cover and said structural member.

19. Portable computer system, comprising a housing having a screen section and a keyboard section; one of said housing sections having a body and a cover, said cover having a first opening and a second opening;

a first speaker positioned adjacent to said first cover opening;

a second speaker positioned adjacent to said second cover opening;

a printed circuit board disposed in said housing body and having a first predetermined continuous track;

a frame disposed in said housing body and having a structural member, said structural member having a second predetermined continuous track;

a first continuous gasket received on said board track and sized to operably provide said first speaker in a first enclosure defined by said board, said cover and said first gasket; and a second continuous gasket received on said structural member track and sized to operably provide said second speaker in a second enclosure defined by said structural member, said cover and said second gasket.

20. System of claim 19 further comprising, a first insert positioned within said first gasket between said cover and said board; and a second insert positioned within said second gasket between said cover and said structural member.

* * * * *